(12) United States Patent
Nogi et al.

(10) Patent No.: US 8,634,426 B2
(45) Date of Patent: Jan. 21, 2014

(54) TRANSMISSION DEVICE WITH FUNCTION OF PACKETIZING AND TRANSMITTING

(75) Inventors: Yoshio Nogi, Yokohama (JP); Masatoshi Shibasaki, Yokohama (JP); Naohiro Sakakida, Tokyo (JP); Yoshihiro Ashi, Yokohama (JP); Kazutaka Sakai, Yamato (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 13/128,788

(22) PCT Filed: Nov. 14, 2008

(86) PCT No.: PCT/JP2008/003328
§ 371 (c)(1), (2), (4) Date: Aug. 19, 2011

(87) PCT Pub. No.: WO2010/055547
PCT Pub. Date: May 20, 2010

(65) Prior Publication Data
US 2012/0027023 A1 Feb. 2, 2012

(51) Int. Cl.
*H04L 12/28* (2006.01)
*H04L 12/66* (2006.01)

(52) U.S. Cl.
USPC ....... 370/395.51; 370/419; 370/463; 370/473

(58) Field of Classification Search
None
See application file for complete search history.

(56) References Cited

U.S. PATENT DOCUMENTS

| | | | |
|---|---|---|---|
| 6,445,683 B1 | 9/2002 | Nobuyasu et al. | |
| 6,891,862 B1* | 5/2005 | Brady et al. | 370/539 |
| 7,586,941 B2 | 9/2009 | Gonda | |
| 2002/0009074 A1* | 1/2002 | Iwahori et al. | 370/358 |
| 2006/0140226 A1* | 6/2006 | Ho et al. | 370/539 |

FOREIGN PATENT DOCUMENTS

| | | |
|---|---|---|
| JP | 05-244203 | 9/1993 |
| JP | 08-186576 | 7/1996 |
| JP | 09-074397 | 3/1997 |
| JP | 11-145963 | 5/1999 |
| JP | 11-145963 A | 5/1999 |
| JP | 2004-229158 A | 8/2004 |
| JP | 2005-505987 A | 2/2005 |
| JP | 2008-236691 A | 10/2008 |
| JP | 2008-271206 A | 11/2008 |

OTHER PUBLICATIONS

TDM-MPLS network interworking—User lane interworking; ITU-T Recommendation Y.1413 (Mar. 2004); pp. i-v; 1-24.
PCT International Search Report on application No. PCT/JP2008/003328 dated Feb. 17, 2009; 1 page.

* cited by examiner

*Primary Examiner* — Yemane Mesfin
*Assistant Examiner* — Christine Duong
(74) *Attorney, Agent, or Firm* — Foley & Lardner LLP

(57) ABSTRACT

When multiple SDH/SONET frame are accumulated and then lower-order path information removed from multiple frames is multiplexed into the same packet to achieve better transmission efficiency during packetization, the delay for accumulating increases. Disclosed is a transmission device that packetizes an SDH/SONET lower-order path with timing which is an integer factor of 1 cycle of the SDH frame. In this case, the destination loads the same multiple lower-order path in one packet. The result is that delay time accompanying lower-order path packetization is kept to less than the time of 1 cycle of the SDH frame, and the efficiency with which lower-order paths are accommodated in packets is further increased. The result is that improved transmission efficiency is realized.

1 Claim, 12 Drawing Sheets

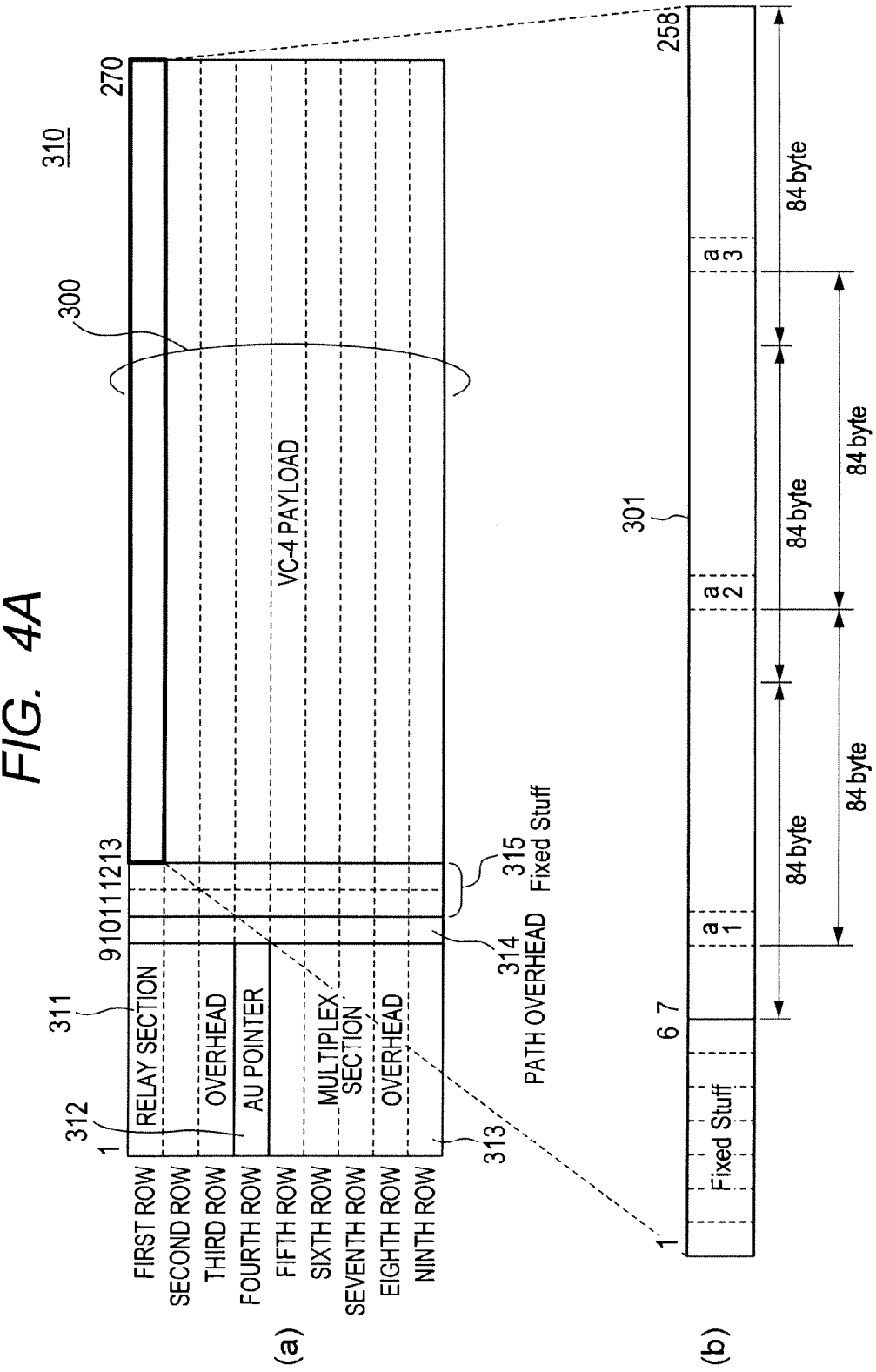

TRANSMISSION DEVICE WITH FUNCTION OF PACKETIZING AND TRANSMITTING

FIELD OF THE INVENTION

The present invention relates to a transmission device having a function for packetizing and transmitting SDH/SONET signals.

BACKGROUND OF THE INVENTION

In recent years, the transition to full IP/Ethernet based backbone networks has been developed in telecommunications carriers. This results in a situation where backbone networks based on the existing SDH/SONET technology and backbone networks based on the new IP/Ethernet technology exist together.

Under such circumstances, in order to eliminate inefficiency in the equipment and maintenance due to the coexistence of networks, a study has been made on the aggregation of SDH/SONET signals into IP/Ethernet-based backbone networks by converting the signals into IP/Ethernet packets. More specifically, the study involves T-MPLS technologies defined in ITU-T Y.1370.1, Y.1371, Y. 1381, and the like.

However, lower-order paths such as VC-11 and VC-12 defined in ITU-T G.707, which is the standard of SDH, are configured with the number of bytes per path in one frame as only 27 bytes (25 bytes for the true user traffic part, excluding management bytes) and 36 bytes, respectively. Thus, in the case of the lower-order path, the ratio of the non-payload occupying in communication increases due to the overhead added in packetization, as well as the gap between frames, depending on the unit of performing the packetization. On the other hand, the ratio of the payload decreases. In order to prevent this, there can be considered a method, as described in non-patent document 1, in which a lower-order path is once accumulated for a sufficiently long time based on the unit of frame, and the accumulated data are packetized all at once. For example, when a path of VC-11 is accumulated for 10 frames of STM-0, the ratio of the payload can be increased to 10 times. Non-patent document 1 recommends a method of accumulating a lower-order path for an integer multiple of bytes, with 25 bytes as the base unit (for one frame), and packetizing the accumulated bytes all at once. However, as the accumulation time becomes longer, the delay time naturally increases.

Non-patent document 1: ITU, "ITU-T Y.1413 TDM-MPLS network interworking-User plane interworking", Section 9.1.1. 2004

SUMMARY OF THE INVENTION

Problem to be Solved by the Invention

The problem to be solved by the present invention is to increase the ratio of the payload (real traffic) when a lower-order path of an SDH/SONET signal is converted into a packet, and to reduce the delay that occurs when the packet passes through a device.

Means for Solving Problem

The present invention distributes a reference frame pulse, which is equivalent to the multiframe synchronization timing of a lower-order path, to an SDH/SONET interface, and aligns the top of the multiple frame of the lower-order path in a lower-order path packetization part. The result is that a common rule is formed to determine the top position of the multiple frame of the lower-order path accommodated in a packet that circulates within the device. In this way, even when a plurality of paths are multiplexed into a packet, a rule for identifying each path is uniquely determined according to the positional relationship within the packet. The result is that the multiplexing of lower-order paths into the packet is facilitated, and the transmission efficiency of the real traffic is improved. By dividing one frame into a plurality of sections and packetizing them, the delay associated with packetization is reduced to less than the time of one frame length.

Effect of the Invention

In a transmission device according to the present invention, when an SONET/SDH signal is packetized and transmitted, it is possible to prevent an increase in the non-payload such as the overhead associated with packetization, and at the same time to reduce the delay associated with packetization.

BRIEF DESCRIPTION OF THE DRAWINGS

FIG. 4A illustrates the accommodation of a lower-order path into MPLS frames (1)

DETAILED DESCRIPTION OF THE PREFERRED EMBODIMENTS

Figure 1:
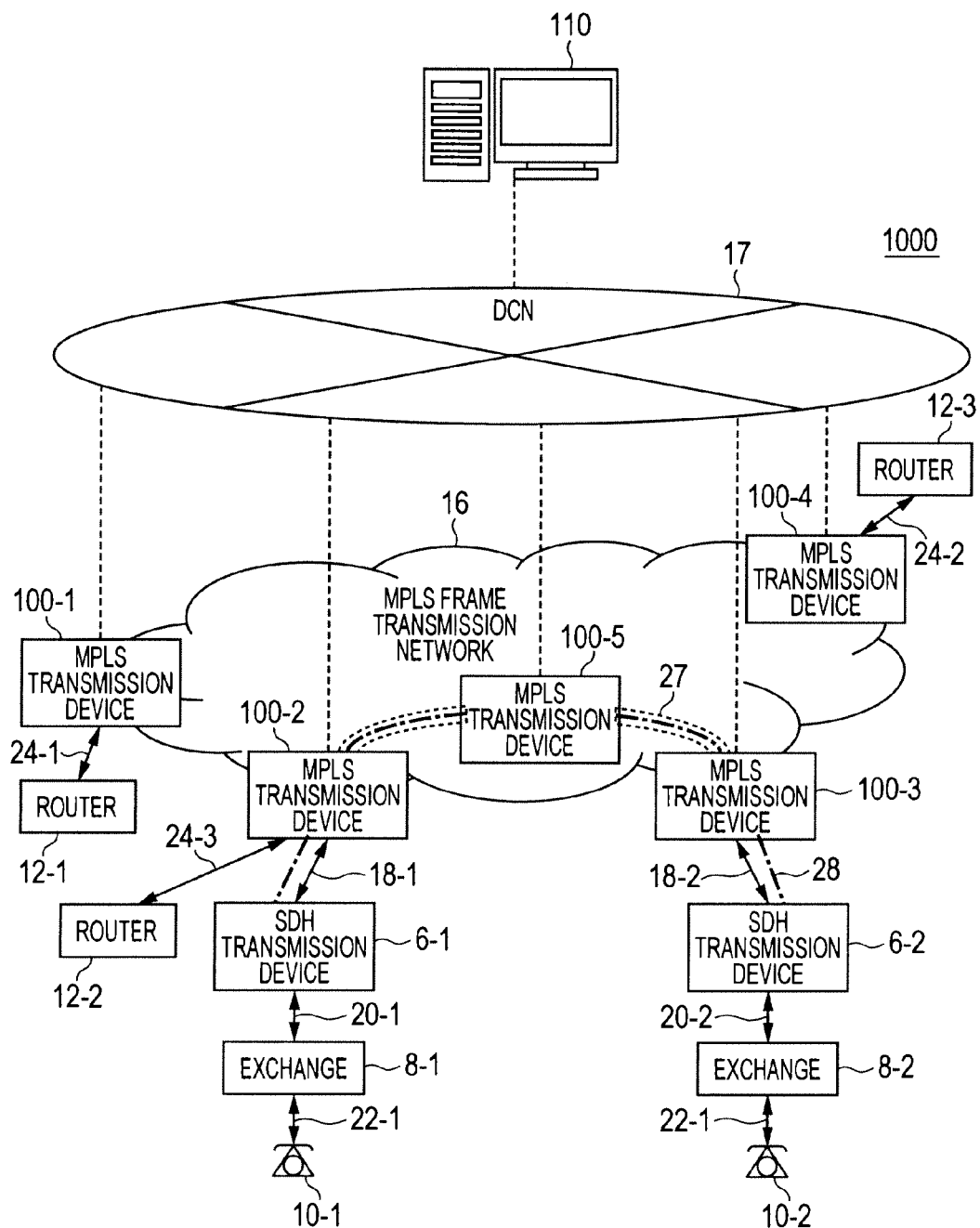
FIG. 1 is a hardware block diagram of a network.

Hereinafter embodiments of the present invention will be described using embodiments with reference to the accompanying drawings. Note that like parts are designated by like reference numerals and their description will not be repeated.

First Embodiment

A first embodiment will be described with reference to FIGS. 1 to 7. First, a network configured to include an MPLS transmission device will be described with reference to FIG. 1. In FIG. 1, a network 1000 includes five MPLS transmission devices 100, SDH transmission devices 6, exchanges 8, telephone sets 10, routers 12, and an MPLS frame transmission network 16. Further, an external monitoring control device 110 is connected to the MPLS transmission devices 100 by a data communication network (DCN) 17 for monitoring control system.

In FIG. 1, an MPLS transmission device 100-2 is connected to an SDH transmission device 6-1 by an SDH STM-1 interface 18-1, and is connected to a router 12-2 by an Ether interface 24-3. An MPLS transmission device 100-3 is connected to an SDH transmission device 6-2 by an SDH STM-1 interface 18-2. The SDH transmission devices 6 are connected to the exchanges 8 by SDH C-11 interfaces 20, respectively. The exchanges 8 are connected to the telephone sets 10 by subscriber telephone interfaces 22, respectively. MPLS transmission devices 100-1 and 100-4 are connected to routers 12-1 and 12-3 by IEEE802.3 interfaces 24, respectively. The SDH transmission devices 6 receive 1.5-Mbit/sec signals, respectively, through the SDH C-11 interfaces 20 to form TU-11 paths. Further, the SDH transmission devices 6 multiplex the paths into an STM-1 signal according to the multiplexing rule of SDH defined in ITU-T G.707, and transmit the signal to the SDH STM-1 interfaces 18, respectively.

In the MPLS frame transmission network 16, there may be variations such as IEEE 802.3 and Packet Over SONET (POS) interfaces as transmission media (physical layers), however, MPLS frame transmission is performed in ether case.

Conventionally, the SDH transmission device 6 is connected to a large capacity SDH multiplex transmission device for further increasing multiplicity, or an SDH cross-connect for cross connect switching, and the like. A network is formed by connecting the entire internal network insides the SDH transmission device 6 by an SDH interface defined in ITU-T G.707. In the network 1000 according to the first embodiment, the SDH transmission device 6 is connected to the MPLS transmission device 100. All signal transmissions are performed in MPLS frames after the MPLS transmission device 100.

In FIG. 1, an MPLS path 27 (LSP) is formed within the MPLS frame transmission network 16 by the MPLS transmission devices 100-2, 100-3, and 100-5, according to the settings from the external monitoring control device 110. A VC-11 lower-order path 28 is formed between the SDH transmission device 6-1 and the SDH transmission device 6-2 through the MPLS path 27.

Figure 2:
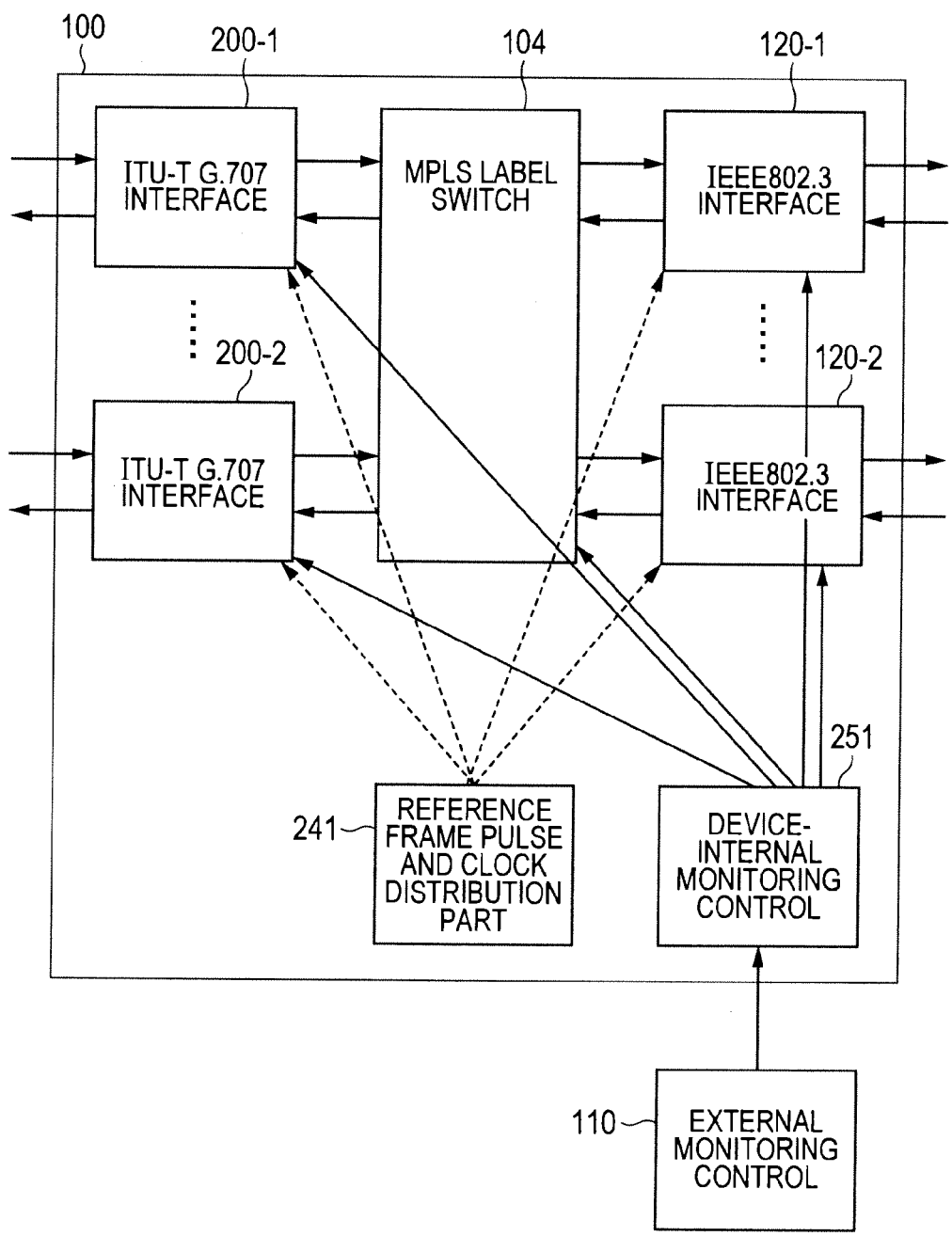
FIG. 2 is a hardware block diagram of an MPLS transmission device.

The functional blocks of the MPLS transmission device will be described with reference to FIG. 2. In FIG. 2, the MPLS transmission device 100 includes an MPLS label switch 104, a plurality of ITU-T G.707 interfaces 200, a plurality of IEEE 802.3 interfaces 120, a reference frame pulse and clock distribution part 241, and a device-internal monitoring control part 251. Further, the external monitoring control 110 is provided outside the MPLS transmission device 100 in order to provide monitoring control of the MPLS transmission device 100 by an operator.

The ITU-T G.707 interfaces 200 and the IEEE802.3 interfaces 120 transmit and receive signals to and from the outside of the device, respectively. Further, The ITU-T G.707 interfaces 200 and the IEEE802.3 interfaces 120 are connected to the MPLS label switch 104 to transmit and receive signals.

The reference frame pulse and clock distribution part 241 generates a frame pulse and a clock to serve as a reference. Further, the reference frame pulse and clock distribution part 241 is connected to the ITU-T G.707 interfaces 200 and the IEEE802.3 interfaces 120, respectively, to provide the reference pulse and clock.

The device-internal monitoring control part 251 is connected to the external monitoring control 110. The device-internal monitoring control part 251 receives control information from the external monitoring control 110, and controls the ITU-T G.707 interfaces 200, the IEEE802.3 interfaces 120, and the MPLS label switch 104. In addition, the device-internal monitoring control part 251 monitors these functional blocks. Further, the device-internal monitoring control part 251 provides monitoring information to the external monitoring control 110.

Figure 3:
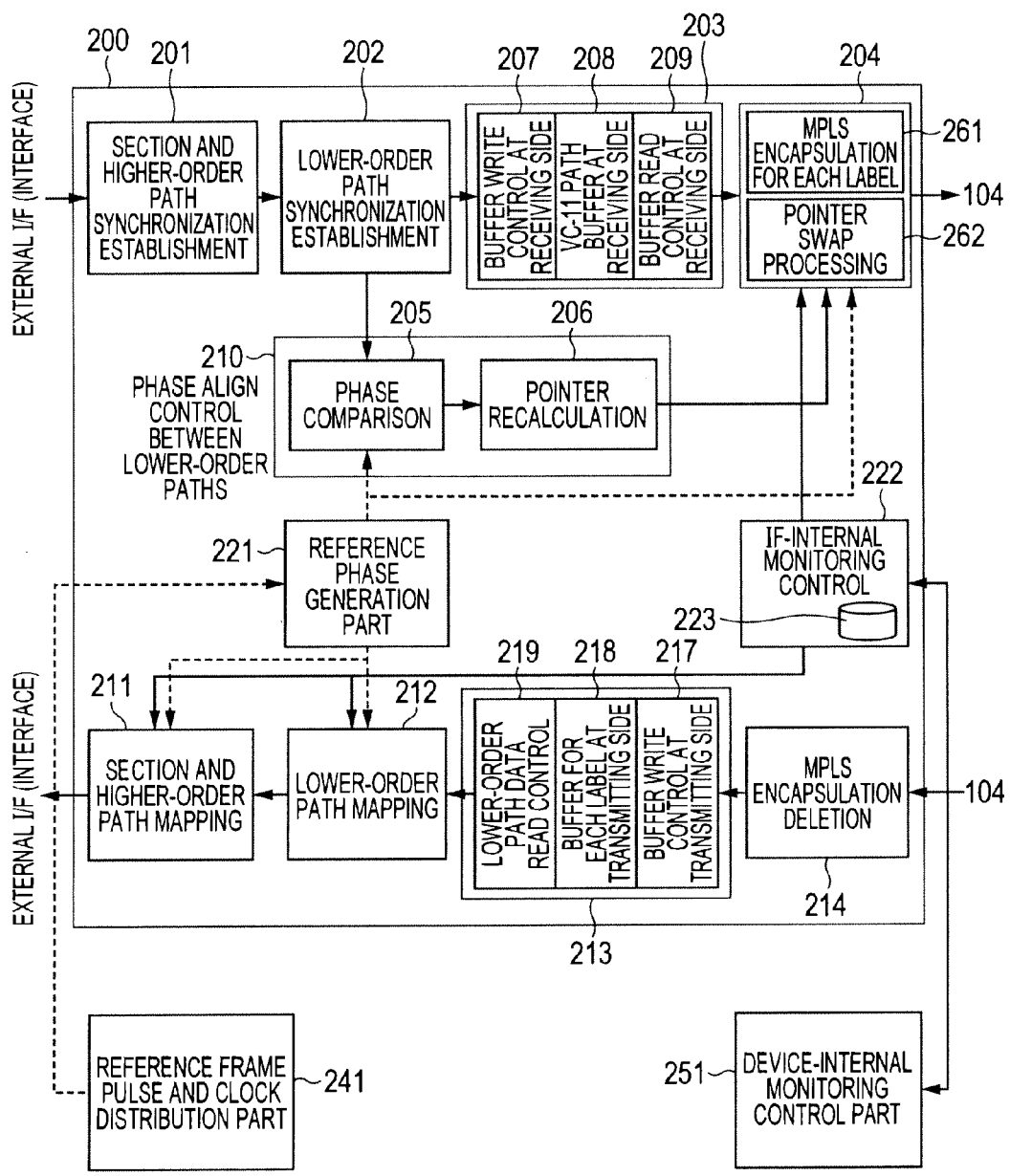
FIG. 3 is a functional block diagram of an SDH/SONET interface.

The functional blocks of the ITU-T G.707 interface 200 will be described with reference to FIG. 3. In FIG. 3, the ITU-T G.707 interface 200 includes a group of functional blocks on the flow of receiving signals from the outside of the transmission device and forwarding a main signal to the MPLS label switch 104 (hereinafter referred to as the reception-side flow), a group of functional blocks on the flow of receiving the signal from the MPLS label switch 104 and transmitting the signal to the outside of the transmission device (hereinafter referred to as the transmitting side flow), and other common functional blocks. Further, in FIG. 3, the reference frame pulse and clock distribution part 241 and the device-internal monitoring control part 251 are also depicted for illustrative purposes.

The functional blocks on the reception-side flow include a section and higher-order path synchronization establishment 201, a lower-order path synchronization establishment 202, a reception-side buffer 203 including a buffer write control at receiving side 207, a VC-11 path buffer at receiving side 208, and a reception-side read control 209, and an MPLS encapsulation part 204 including an MPLS encapsulation for each label 261 and a pointer swap processing 262. These blocks are connected in this order.

The functional blocks on the transmitting side flow include an MPLS encapsulation deletion 214, a transmitting side buffer 213 including a buffer write control at transmitting side 217, a buffer for each label at transmitting side 218, and a lower-order path data read control 219, a lower-order path mapping 212, and a section and higher-order path mapping 211. These blocks are connected in this order.

The other common functional blocks include a phase align control between lower-order paths 210 including a phase comparison 205 and a pointer recalculation 206, a reference phase generating part 221, and an IF-internal monitoring control 222 for storing cross-connect information 223. The reference frame pulse and clock distribution part 241 provides a reference frame pulse and a reference clock to the reference phase generating part 221. The reference phase generating part 221 frequency-divides the reference frame pulse and the reference clock to generate a reference frame and clock used in the ITU-T G.707 interface 200. The reference phase generating part 221 provides the reference frame pulse and clock to the phase comparison 205, the MPLS encapsulation part 204, the lower-order path mapping 212, and the section and higher-order path mapping 211. Further, the device-internal monitoring control part 251, which is connected to the IF-internal monitoring control 222, transmits control information and receives monitoring information.

First, an overview of the process of the reception-side flow will be described. The section and higher-order path synchronization establishment 201 receives an ITU-T G. 707 compliant signal from the outside of the transmission device. Then, the section and higher-order path synchronization establishment 201 establishes synchronization with the section and higher-order path defined in ITU-T G.707. The section and higher-order path synchronization establishment 201 performs termination process of the section and higher-order path. Then, the section and higher-order path synchronization establishment 201 forwards the processed signal to the lower-order path synchronization establishment 202.

The lower-order path synchronization establishment 202 receives the signal processed by the section and higher-order path synchronization establishment 201, and establishes synchronization with the lower-order path defined in ITU-T G.707.

The higher-order path and lower-order path defined in ITU-T G.707 are mapped on ITU-T G.707 section frame by the pointer synchronization method. At this time, the phase relationship with the section frame, which is a reference for each path, is different. The lower-order path synchronization establishment 202 provides the received information, including the phase information of the section, the pointer information of each higher-order path, and the pointer information of each lower-order path, to the phase comparison 205. The lower-order path synchronization establishment 202 stores the received lower-order path data in a predetermined path buffer for each lower-order path in the reception-side buffer 203. The phase comparison 205 compares the information received from the lower-order path synchronization establishment 202, including the section phase extracted from the signal from the transmission device external interface, the pointer information of the higher-order path, and the pointer information of the lower-order path, with the phase of the device-internal reference frame pulse received from the reference phase generating part 221. Then, the phase comparison 205 calculates the phase difference. Further, the phase comparison 205 forwards the calculated phase difference of each lower-order path from the reference frame pulse, as well as the lower-order path pointer information to the pointer recalculation 206.

The pointer recalculation 206 recalculates the pointer information of each respective lower-order path, based on the information received from the phase comparison 205, including the pointer information of each respective lower-order path, and the information of phase difference from the reference frame pulse in the device. The MPLS encapsulation part 204 reads the lower-order path signal accumulated in the reception-side buffer 203, accordingly, based on the cross-connect information 223 indicating the destination of each lower-order path provided by the IF-internal monitoring control 222, based on the device-internal reference frame pulse and reference clock provided by the reference phase generating part 221. The MPLS encapsulation part 204 maps, or encapsulates the lower-order path signal into the payload part of the MPLS frame. Note that the method of mapping the lower-order path signal into the payload part of the MPLS frame will be described below. The MPLS encapsulation part 204 transmits the MPLS frame in which the lower-order path signal is stored in the payload part, to the MPLS label switch 104 as needed. Note that the operation of the buffer write control at receiving side 207, the VC-11 path buffer at receiving side 208, and the buffer read control at receiving side 209 in the reception buffer 203 will be described in detail with reference to FIG. 6.

Next, an overview of the process of the transmission-side flow will be described. The MPLS encapsulation deletion 214 receives the MPLS frame from the MPLS label switch 104. The MPLS encapsulation deletion 214 extracts the payload part and stores the payload data in the transmission-side buffer 213. The lower-order path mapping 212 sequentially reads the lower-order path signal from the corresponding part of the transmission-side buffer 213, based on the device-internal reference frame pulse and reference clock provided by the reference phase generating part 221, and on the lower-order path information 223 provided by the IF-internal monitoring control 222. The lower-order path mapping 212 forwards the lower-order path signal to the section and higher-order path mapping 211.

The section and higher-order path mapping 211 maps the lower-order path into the higher-order path and then maps the higher-order path into the section frame, based on the device-internal reference frame pulse and reference clock provided by the reference phase generating part 221, and on the lower-order path cross-connect information 223 provided by the IF-internal monitoring control 222. The section and higher-order path mapping 211 forms a section signal defined in ITU-T G.707, and transmits the section signal to the external interface. Note that the operation of the transmission-side path buffer for each label 218 and the transmission-side buffer read control 219 will be described in detail with reference to FIG. 7.

Figure 4B:
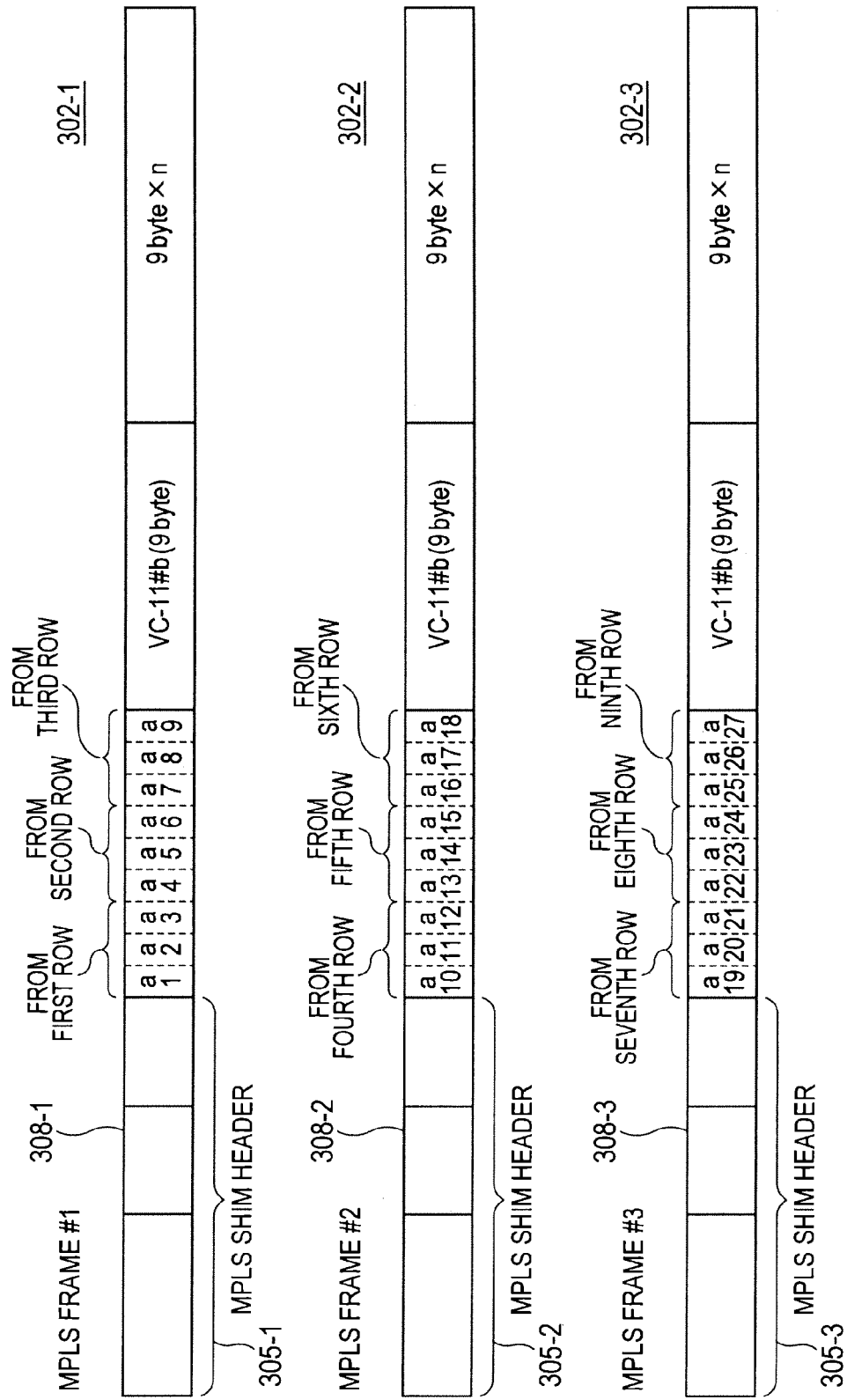
FIG. 4B illustrates the accommodation of a lower-order path into MPLS frames (2)

Referring to FIGS. 4A and 4B, a description will be given of the structure of the STM-1 section frame defined in ITU-T G.707, mapping of a higher-order path VC-4 in an STM-1 frame, mapping of a lower-order path VC-11 in the VC-4, and accommodation method of the lower-order path, VC-11 path, into MPLS frames. Here, FIG. 4(a) shows the frame format of the STM-1. FIG. 4(b) shows the format of the VC-4 payload for one row. FIG. 4(c) shows the format of the MPLS frames in which the VC-11 path is accommodated.

In FIG. 4(a), the STM-1 section frame defined in ITU-T G.707 is generally structured in a format of 270 bytes×9 rows. This is because that the control information of the section frame is provided for every 270 bytes, and that one frame cycle of STM-1 is set to 270×9 bytes (125 μsec). The STM-1 section frame 310 includes a relay section overhead 311, an AU pointer 312, a multiplex section overhead 313, a path overhead 314, a fixed stuff 315, and a VC-4 payload 300. In the STM-1 frame, the payload 300 of the higher-order path VC-4 is allocated from the 13th byte to the 270th byte in each row. The top position of the higher-order path VC-4 in the area of the VC-4 payload 300 is specified by the AU pointer 312.

FIG. 4(b) shows the VC-4 payload 300 for one row. In the VC-4 payload for one row 301, the top 6 bytes are allocated to the fixed stuff. The data of the lower-order path VC-11 is not mapped into the fixed stuff part. The data of the lower-order path VC-11 starts with the 7th byte. Subsequently, the independent data of the lower-order path VC 11 is mapped from the 7th byte to the 90th byte in the unit of one byte. Then, the data of the same lower-order path VC-11 is mapped with 84 bytes per cycle, which is repeated three times in total. Thus, the data of a certain lower-order path VC-11 #a is contained in 3 bytes in one row of the higher-order path VC-4, so that 3×9=27 bytes of data is contained in one frame cycle of the higher-order path VC-4.

In FIG. 4(b), a1 byte, which is the top of the lower-order path VC-11 #a, is contained in the 7th byte to the 90th byte, and then a2 and a3 are subsequently mapped every 84 bytes. Further, the mapping position such as a1 byte is specified by the upper device.

FIG. 4(c) shows that the STM-1 section frame, which is defined in ITU-T G. 707, is divided into 3 sections, and that the divided sections are accommodated in individual MPLS frames. It is shown that the VC-11 information contained in one STM-1 section frame is divided into three sections and accommodated in MPLS frames 302-1 to 302-3. In FIG. 4(c), the lower-order path VC-11 signal for three rows of 3×3=9 bytes is accommodated. Note that 3 rows are equivalent to one-third of one cycle of the STM-1 frame. The MPLS frame 302-1 accommodates the data of VC-11 contained in the first to third rows of the STM-1 frame. The MPLS frame 302-2 accommodates the data of VC-11 contained in the fourth to sixth rows of the STM-1 frame. The MPLS frame 302-3 accommodates the data of VC-11 contained in the seventh to ninth rows of the STM-1 frame.

In the MPLS frame 302 in which the lower-order path VC-11 is encapsulated, a plurality of lower-order paths, such as lower-order paths VC-11 #a, #b with the same destination, are multiplexed and accommodated into one MPLS frame. Note that switching of the MPLS frame is performed based on an MPLS label 308 present in an MPLS shim header 305 which is the header information of the MPLS frame 302. The MPLS frames 302-1 to 302-3 have the same destination, so that the MPLS labels 308-1 to 308-3 have the same value. Note that when the data length of the lower-order path VC-11 accommodated in the MPLS frame 302 is less than the minimum frame length, the shortage is filled with PAD.

Figure 5:
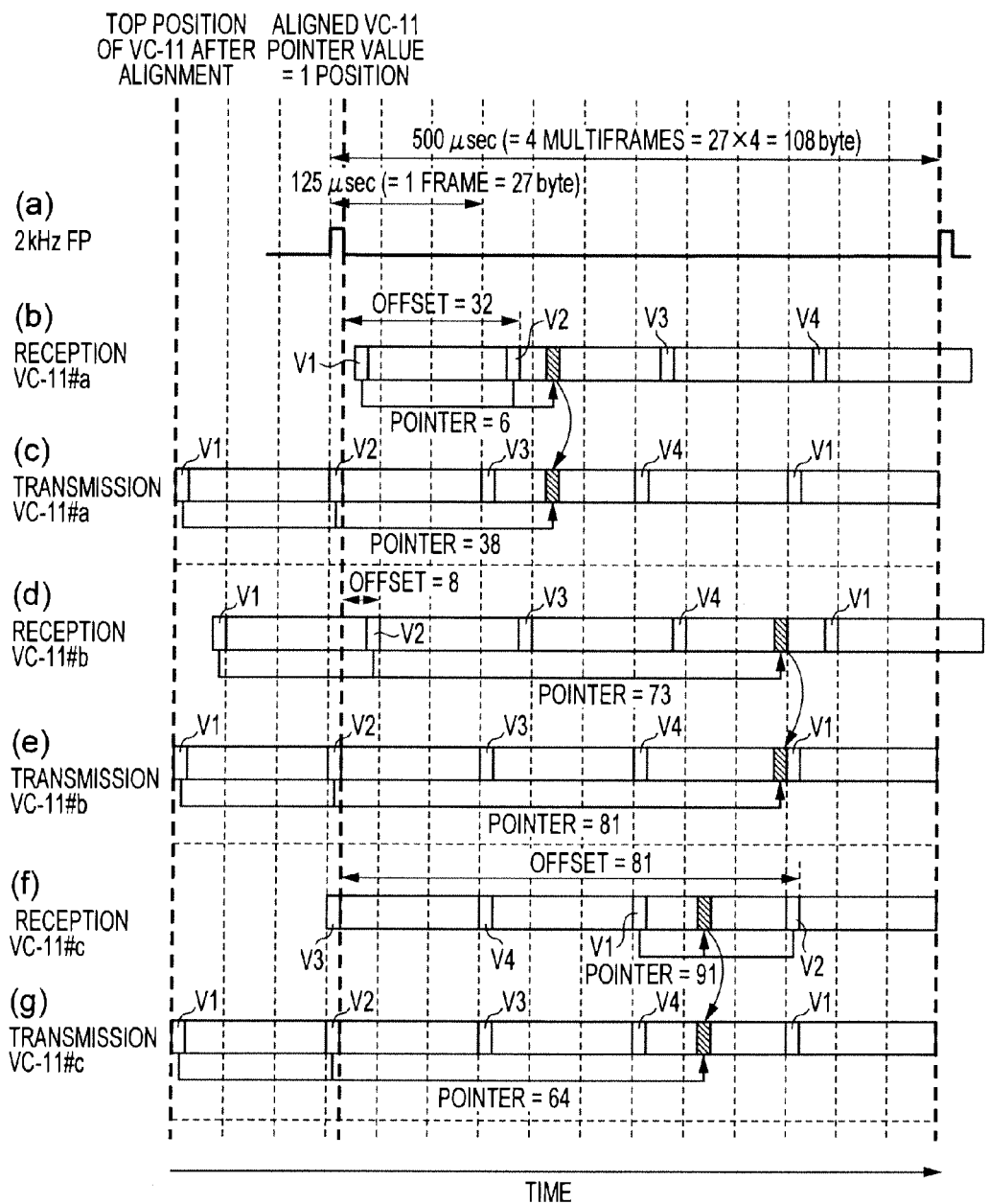
FIG. 5 illustrates the alignment of lower-order paths.

The operation of the phase align control between lower-order paths 210 will be described with reference to FIG. 5. FIG. 5 is a timing chart showing that the phases of all the received lower-order paths VC-11 are encapsulated into MPLS frames, by adjusting the phases to the device-internal reference frame pulse, and by calculating new pointer values. Here, FIG. 5(a) shows the device-internal reference frame pulse (FP: Frame Pulse). FP is equal to 2 kHz, which is the cycle of the VC-11 multiframe. FIG. 5(b) shows the waveform of the reception VC-11 #a data arranged in a time series. FIG. 5(c) shows the waveform of the transmission VC-11 #a data arranged in a time series. FIG. 5(d) shows the waveform of the reception VC-11 #b data arranged in a time series. FIG. 5(e) shows the waveform of the transmission VC-11 #b data arranged in a time series. FIG. 5(f) shows the waveform of the reception VC-11 #c data arranged in a time series. Further, FIG. 5(g) shows the waveform of the transmission VC-11 #c data arranged in a time series. Note that, for simple illustration, FIGS. 5 (c), (e), (g) describe the waveforms based on the previous frame pulse. Here, the waveforms are shown as the reception VC-11 data with the reception timing of the reception buffer write control 207. Further, the waveforms are shown as the transmission VC-11 data with the transmission timing of the transmission buffer read control 209.

In each figure of FIGS. 5(a) to (g), the horizontal axis represents the time, in which one grid corresponds to 125/3 μsec, representing a width of one-third cycle of the STM-1 frame cycle 8 kHz. Thus, three grids correspond to one cycle of the STM-1 frame cycle 8 kHz, 125 μsec. The amount of data of each lower-order path VC-11 included in this period is 27 bytes. Further, in FIG. 5(a), the lower-order path VC-11 has a 4-multiframe structure. Thus, the lower-order path VC-11 has one cycle of 500 μsec, corresponding to STM-1 1 frame (=125 μsec)×4 cycles.

In FIG. 5(b), the received lower-order path VC-11 #a has V2 byte, which is one of the management bytes within the multiframe of the lower-order path, appearing at a position distant by 32 bytes after reception of the device-internal reference frame pulse. Note that V2 byte stores the pointer information indicating the top position of the traffic to be accommodated, together with V1 byte in the multiframe of the lower-order path. In the following description, this describes that the V2 byte has an offset of 32 bytes from the reference position of the device-internal reference frame pulse.

The VC-11 #a has an offset of 32 bytes from the device-internal reference frame pulse. The pointer value indicated by V1 and V2 is 6. This shows that the top of the payload of the lower-order path VC-11 #a is placed in the 6th byte after V2, and is also placed in the 32+6=38th byte from the device-internal reference frame pulse.

Similarly, in FIG. 5(d), the reception lower-order path C-11 #b has an offset of 8 bytes with respect to the device-internal reference frame pulse, in which the pointer value is 73. In FIG. 5(f), the reception lower-order path VC-11 #c has an offset of 81 bytes with respect to the device-internal reference frame pulse, in which the pointer value is 91.

Further, in FIGS. 5(c), (e), and (g), the position of V1, which is the top position of the multiframes of the transmission VC-11 #a, the transmission VC-11 #b, and the transmission VC-11 #c, is aligned at 125 μsec before the device-internal reference frame pulse. Thus, the pointer position V2 of all the transmission paths is coincident with the position of the device-internal reference frame pulse. Further, it is assumed that the transmission data of the transmission VC-11 #a, the transmission VC-11 #b, and the transmission VC-11 #c are equal to the reception data of the reception VC-11#a, the reception VC-11#b, and the reception VC-11#c, respectively, with the same timing with respect to the FP. In other words, the position indicated by the pointer is the same position with respect to the FP (as indicated by the arrow from FIG. 5(b) to (c)).

As described above, the pointer recalculation 206 calculates the pointer value of each transmission VC-11. The recalculated pointer values are as follows: 32+6=38 for the transmission VC-11 #a; 8+73=81 for the transmission VC-11 #b; and 81+91=172 for the transmission VC-11 #c. However, the calculated new pointer value of the transmission VC-11 #c exceeds 4×27=108, which is the 4 multiframe cycle, so that 172−108=64 is set to the new pointer value.

Figure 6:
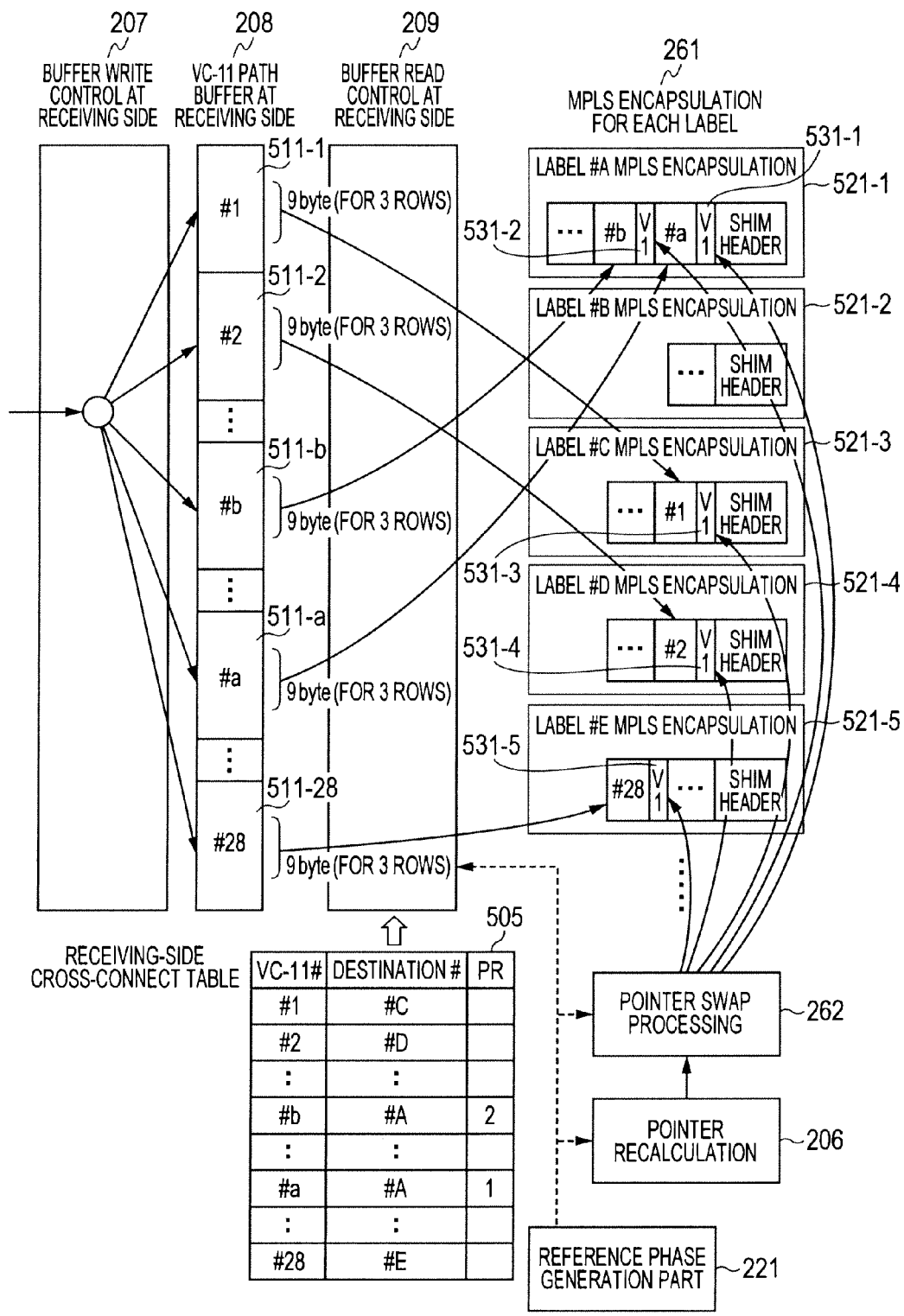
FIG. 6 illustrates the encapsulation of lower-order paths.

The actual MPLS encapsulation process will be described with reference to FIG. 6, by only showing the necessary configurations of the reception-side buffer 203, the MPLS encapsulation part 204, the phase align control between lower-order paths 210, the reference phase generating part 221, and the IF-internal monitoring control 222 in the ITU-T G. 707 interface.

The configurations necessary for the description of the MPLS encapsulation process are the buffer write control at receiving side 207, the VC-11 path buffer at receiving side 208, the buffer read control at receiving side 209, the MPLS encapsulation for each label 261, the reception-side cross-connect table 505, the pointer swap processing 262, the pointer recalculation 206, and the reference phase generating part 221.

The buffer write control at receiving side 207 receives the synchronized VC-11 path data, and writes the received data cyclically in a storage area 511 prepared in the VC-11 path buffer at receiving side 208 for each VC-11 path. Here, the VC-11 path buffer at receiving side 208 is configured to include a VC-11 #1 storage area 511-1, a VC-11 #2 storage area 511-2, a VC-11 #b storage area 511-b, a VC-11 #a storage area 511-a, and a VC-11 #28 storage area 511-28.

The reception-side cross-connect table 505 stores the label information, namely, the destination information for each VC-11. Here, the reception-side cross-connect table 505 stores the information as follows. The destination of VC-11 #1 is #C, the destination of VC-11 #2 is #D, the destination of VC-11 #b is #A, the destination of VC-11 #a is #A, and the destination of VC-11 #28 is #E. Note that PR (Priority) represents the multiplexing order of the data with the same destination #A.

Further, the MPLS encapsulation for each label 261 is provided with MPLS encapsulations 521 for the individual labels to perform MPLS encapsulation. Here shows a label #A MPLS encapsulation 521-1, a label #B MPLS encapsulation 521-2, a label #C MPLS encapsulation 521-3, a label #D MPLS encapsulation 521-4, and a label #E MPLS encapsulation 521-5.

The buffer read control at receiving side 209 reads the destination information of each VC-11 path from the reception-side cross-connect table 505. The buffer read control at receiving side 209 receives a reference phase signal of less than 1 section frame time (125 μsec), which is defined in ITU-T G.707, from the reference phase generating part 221. The buffer read control at receiving side 209 reads data for the data length to be stored in one packet, from the top of the unread area of the individual path data storage areas 511-1 to 511-28 in the VC-11 path buffer at receiving side. Then, the buffer read control at receiving side 209 forwards the data to each of the MPLS encapsulations 521. The MPLS encapsulations 521 store the information in the payload part of the MPLS capsule. In this way, the data of the lower-order paths VC-11 with the same destination are all stored in one MPLS frame, and encapsulated into the MPLS frame within a time less than one frame time defined in ITU-T G.707.

The pointer swap processing 262 receives the new pointer values recalculated to absorb the phase difference of the individual paths, from the pointer recalculation 206. The pointer swap processing 262 sets each new pointer value at the top of the pointer information accommodation position within the payload part in which the path information is accommodated. Here, the pointer information accommodation position is set to V1 byte and V2 byte. For illustrative convenience, only a V1 byte 531 is shown here. Note that the cycle of appearance of the MPLS frame including V1 byte and V2 byte, is one frame in every 12 frames.

Here, the reference phase signal provided by the reference phase generating part 221 to the buffer read control at receiving side 209, is with the timing of one-third of one section frame defined in ITU-T G.707. The data of three rows (9 bytes) for one VC-11 path, namely, one-third of the data contained in the STM-1 frame, is stored in one MPLS frame. In addition, the MPLS encapsulation for each label 261 receives the pointer value recalculated based on the logic described in FIG. 5, from the pointer recalculation 206, to perform a process of replacing the existing pointer with the recalculated pointer information.

Figure 7:
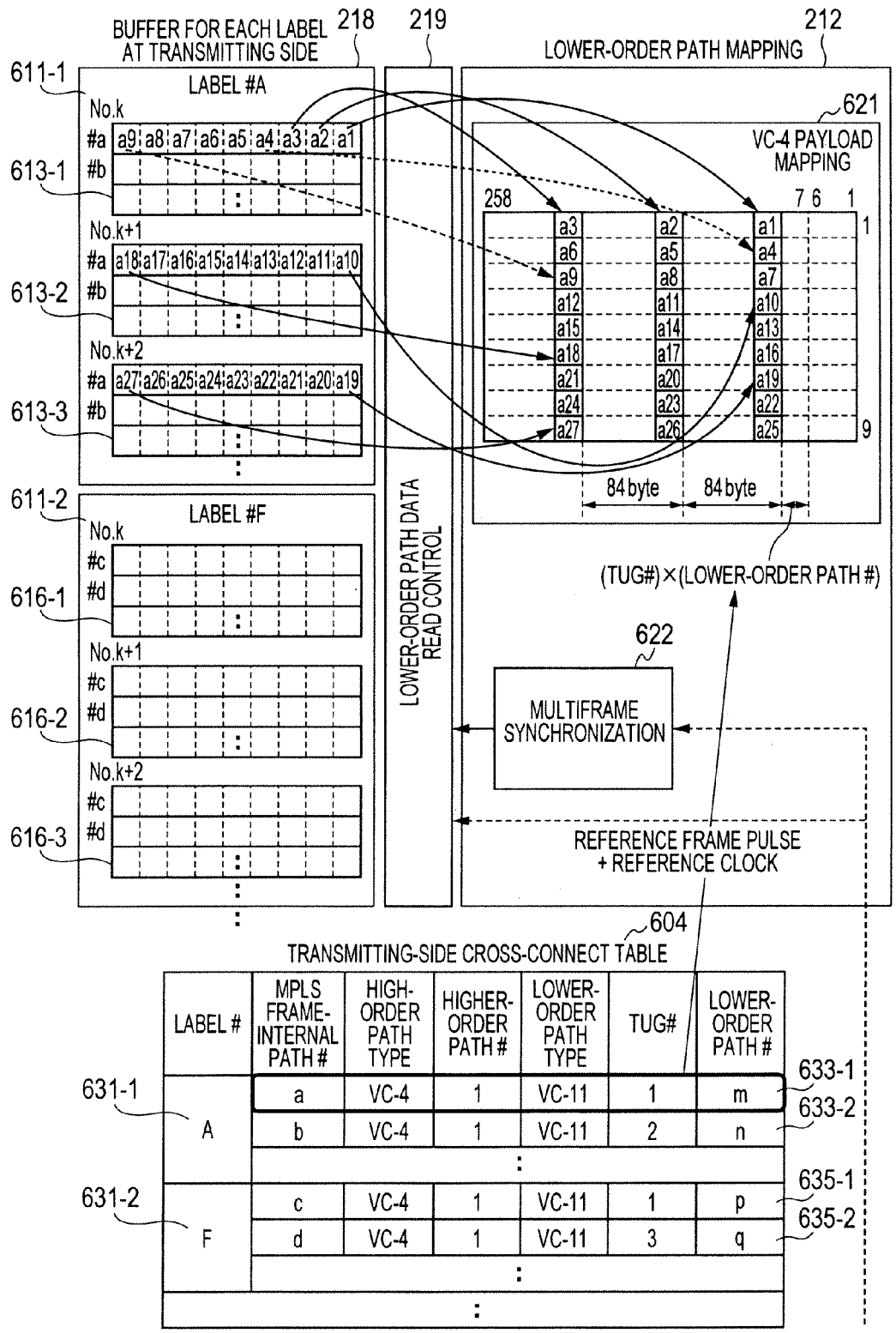
FIG. 7 illustrates the extraction of lower-order paths from MPLS frames, and the mapping to higher-order paths.

Referring to FIG. 7, a description will be given of a process of reproducing the lower-order path VC-11 data from the MPLS frame in the transmission-side ITU-T G.707 interface. Here, the description will be given by only showing the configurations necessary for explanation, of the configurations of the transmission-side buffer 213, the lower-order path mapping 212, and the IF-internal monitoring control 222.

In the transmission-side buffer 213, the buffer area is separated for each label with a different transmission source. Here is shown a buffer for each label at transmitting side 218, as well as a label #A buffer 611-1 and a label #F buffer 611-2 as further details. This shows that one is the buffer area of the MPLS frame with a label #A, and the other is the buffer area of the MPLS frame with a label #F, respectively. Further, the label #A buffer 611-1 and the label #F buffer 611-2 have an area for storing the received MPLS frames in time series order.

FIG. 7 shows that the label #A buffer 611-1 has a buffer area 613-1 for the No. k th received MPLS frame, a buffer area 613-2 for the No. k+1 th received MPLS frame, and a buffer area 613-3 for the No. k+2 th received MPLS frame. Further, the label #F buffer 611-2 has a buffer area 616-1 for the No. k th received MPLS frame, a buffer area 616-2 for the No. k+1 th received MPLS frame, and a buffer area 616-3 for the No. k+2 th received MPLS frame.

Note that in the MPLS frame buffer areas 613, 616 corresponding to each of the time series data, the VC-11 lower-order path data defined in ITU-T G.707 with the same destination are multiplexed and encapsulated into one MPLS frame, with a cycle of one-third the section frame. The MPLS frame buffer areas 613, 616 have a buffer area of {9×(the lower-order path multiplexed in the MPLS frame)} bytes. Note that the transmission-side buffer 213 includes the lower-order path data read control 219 shown in FIG. 7.

The lower-order path mapping 212 includes a VC-4 payload mapping 621 and a multiframe synchronization 622. The multiframe synchronization processing 622 receives a reference frame pulse and a reference clock, and provides read and write timings to the lower-order path data read control 219.

Further, the cross-connect table at transmitting side 604, which indicates only the transmission-side information of the cross-connect information present in the IF-internal monitoring control 222, has the lower-order path information multiplexed for each transmission source, namely, for each label of the MPLS frame. In addition, the cross-connect table at transmitting side 604 also has the insertion position information of the lower-order path in the ITU-T G.707 VC-4 payload.

FIG. 7 shows two areas in the cross-connect table at transmitting side 604: one is an area 631-1 corresponding to the label #A, and the other is an area 631-2 corresponding to the label #F. Here, the VC-11 paths a and b are multiplexed into the label #A MPLS frame. The VC-11 paths a and b are mapped to the m th position of TUG #1 of VC-4 and the n th position of TUG#2 of VC-4, respectively. Further, the VC-11 paths c and d are multiplexed into the label #F MPLS frame. The VC-paths c and d are mapped to the p th position of TUG#1 of VC-4 and the q th position of TUG#3 of VC-4, respectively.

The cross-connect table at transmitting side 604 also shows details of the entries of the individual paths. In other words, the cross-connect table at transmitting side 604 shows a VC-11 #a cross-connect data entry 633-1, a VC-11 #b cross-connect data entry 633-2, a VC-11 #c cross-connect data entry 635-1, and a VC-11 #d cross-connect data entry 635-2, respectively. The entries 633, 635 store the type of higher-order paths for multiplexing, the order of the higher-order paths in the STM-1 frame, the type of lower-order paths themselves, the TUG number for multiplexing the lower-order paths, and the position information of the lower-order paths in the TUG.

In the following description, a process of mapping from the payload of the MPLS frame to the VC-4 payload will be described, focusing on the lower-order path VC-11 #a contained in the label #A MPLS frame for easy understanding.

Now, it is assumed that the top of the VC-11 multiframe is stored in the No. k th packet of the label #A buffer 611-1 within the buffer for each label at transmitting side 218. In this case, the data of VC-11 #a and VC-11 #b are stored in 9 bytes, respectively. The top byte of the VC-11 path insertion area of each No. k th packet surely corresponds to the top byte of the VC-11 multiframe. The lower-order path data read control 219 reads the data from the No. k th MPLS frame storage area 613-1 of the label #A buffer 611-1 within the buffer for each label at transmitting side 218, at timing synchronized with the device-internal reference frame pulse and reference clock information. The read data is mapped to a predetermined position by the VC-4 payload mapping, based on the information of the cross-connect table at transmitting side 604. In mapping, the top position is calculated by the product of the TUG number and the lower-order path number, and then the data is sequentially mapped in the unit of one byte in every 84 bytes. Basically all the path data are inserted into one row, so that each time one row is completed, the data is forwarded to the section and higher-order path mapping 211.

Note that V1 byte and V2 byte that appear in one frame in every 12 MPLS frames are also mapped to predetermined positions. The V1 byte and V2 byte are used in the subsequent SDH/SONET section. However, V1 byte appearing at the payload top in one frame in every 12 MPLS frames, is used for the pointer synchronization.

As described above with reference to FIGS. 2 to 7, it is possible to realize encapsulation and decapsulation (reproduction) of the lower-order path VC-11 defined in ITU-T G.707 by the MPLS transmission device 100. Further, according to this embodiment, it is possible to increase the transmission efficiency by setting the waiting time, namely, the delay time associated with the encapsulation, to one-third the frame time of the STM-1 frame, and transmitting the encapsulate MPLS frame in which the data of a plurality of paths are multiplexed.

Note that the first embodiment describes the case in which MPLS frames are used as packets. However, packets other than the MPLS frames, such as VLAN-based MAC frames, can also be used.

Further, this embodiment shows the case using ITU-T G.707 STM-1 as the section signal, VC-4 as the higher-order path, and VC-11 as the lower-order path. However, other section signals, higher-order paths, and lower-order paths can also be encapsulated and transmitted based on the same concept. Further, in this embodiment, there is no particular description about the transmission interface after MPLS frame formation. However, it is possible to transmit the MPLS frame directly by using an IEEE802.3 interface, or by using POS with the ITU-T G.707 interface as the physical medium.

Note that in SONET defined in Telcordia GR-253-CORE, which is the same technology as SDH defined in ITU-T G.707, it is also possible to use the present invention to configure a transmission device for transmitting lower-order paths multiplexed into the MPLS frame. In the present specification, the SDH interface or SONET interface may also be referred to as SDH/SONET interface. Further, the lower-order path or higher-order path is the lower-order path or higher-order path defined in ITU-T G.707 or Telcordia GR-253-CORE. Furthermore, the interface defined in IEEE802.3 may also be referred to as Ether interface.

Second Embodiment

A second embodiment will be described with reference to FIGS. 8 and 9. The second embodiment relates to an additional function that enables the cross-connect table to be changed without instantaneous interruption, when a change in the cross-connect table occurs within the transmission device.

Figure 8:
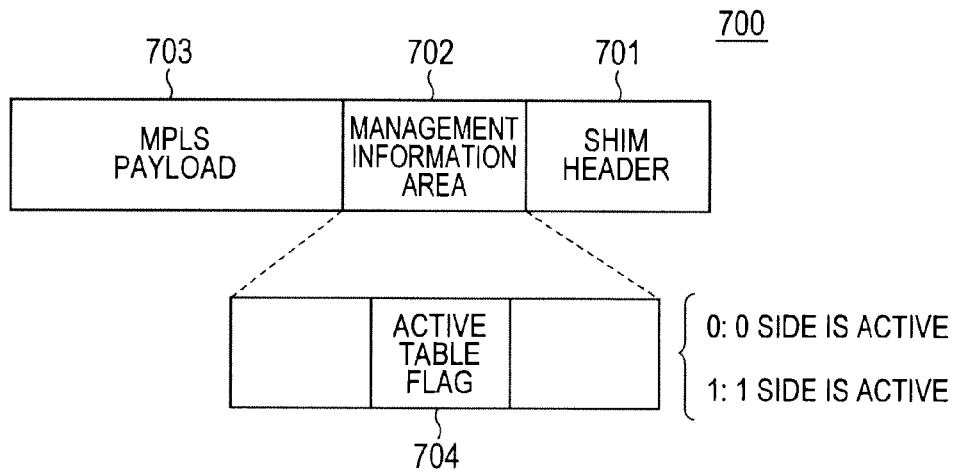
FIG. 8 illustrates the configuration of the MPLS frame.
Figure 9:
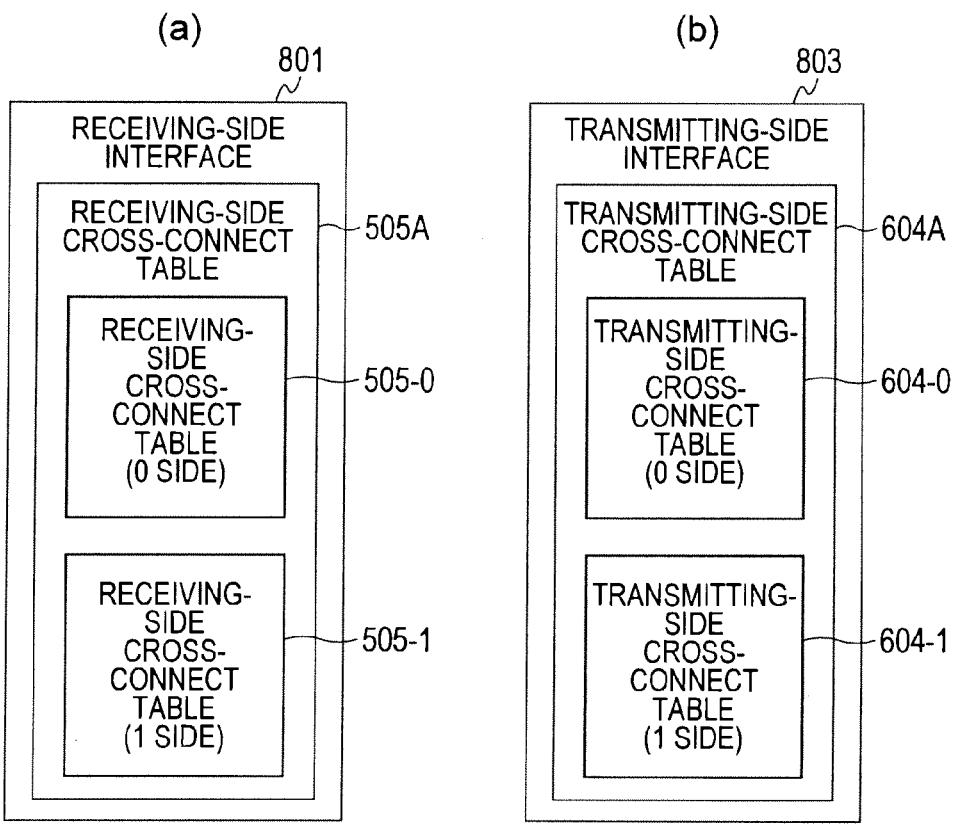
FIG. 9 illustrates the configuration of cross connect tables.

Referring to FIG. 8, a description will be given of the format of an MPLS frame in which a lower-order path VC-11 is encapsulated. In FIG. 8, an MPLS frame 700 includes an MPLS shim header 701, an MPLS payload 703, and a management information area 702. The management information area 702 is provided with an active table flag 704 indicating the active cross-connect table information. The active table flag 704 with 0 indicates that the flag uses the 0 side of the cross-connect table, while with 1 indicates that the flag uses use the 1 side of the cross-connect table.

The configuration of the cross-connect table will be described with reference to FIGS. 9(a) and 9(b). Here, FIG. 9(a) is a view showing a reception-side cross-connect table used in the reception interface. FIG. 9(b) is a view showing a cross-connect table at transmitting side used in the transmission interface. FIGS. 9(a) and 9(b) show the configuration of a reception-side cross-connect table 505A used in a reception-side interface 801 on the reception-side flow, and the configuration of a cross-connect table at transmitting side 604A provided in a transmission-side interface 802 on the transmission-side flow.

The reception-side cross-connect table 505A of FIG. 9(a) includes two cross-connect tables: a reception-side cross-connect table 505-0 and a reception-side cross-connect table 505-1. Further, the cross-connect table at transmitting side 604A of FIG. 9(b) also includes two cross-connect tables: a cross-connect table at transmitting side 604-0 and a cross-connect table at transmitting side 604-1.

Both in transmission and reception, when the 0-side cross-connect table is used, the value of the active table flag is 0. Further, the initial 1-side cross-connect table is a copy of the 0-side cross connect table.

When a change in the cross-connect table occurs, first the change is applied to the 1-side cross-connect table which is a waiting side. After completion of the change both in the transmission-side and reception-side cross-connect tables, a table switching instruction is given to the receiving side. On the receiving side, the side of the cross-connect table to be used is changed to the 1 side, and the value of the active flag 704 of the packet is changed to 1. Upon receiving the packet, the other transmitting side interface switches the cross-connect table to be used to the 1 side. In this way, the change can be achieved without instantaneous interruption, by synchronizing the change timing of the receiving side and transmitting side cross connections.

Third Embodiment

Figure 10:
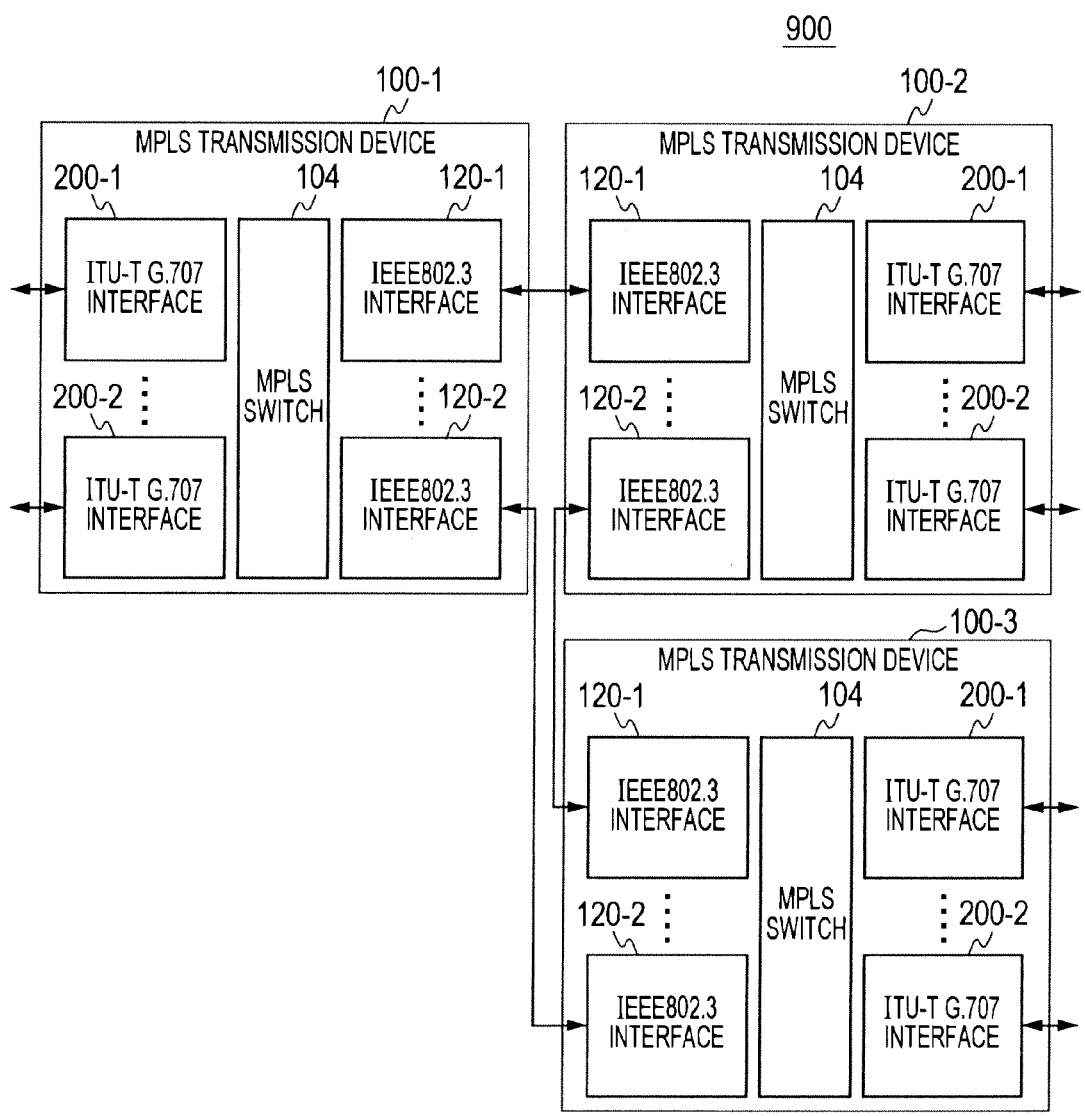
FIG. 10 is a hardware block diagram of a full mesh network of 3 nodes.
Figure 11:
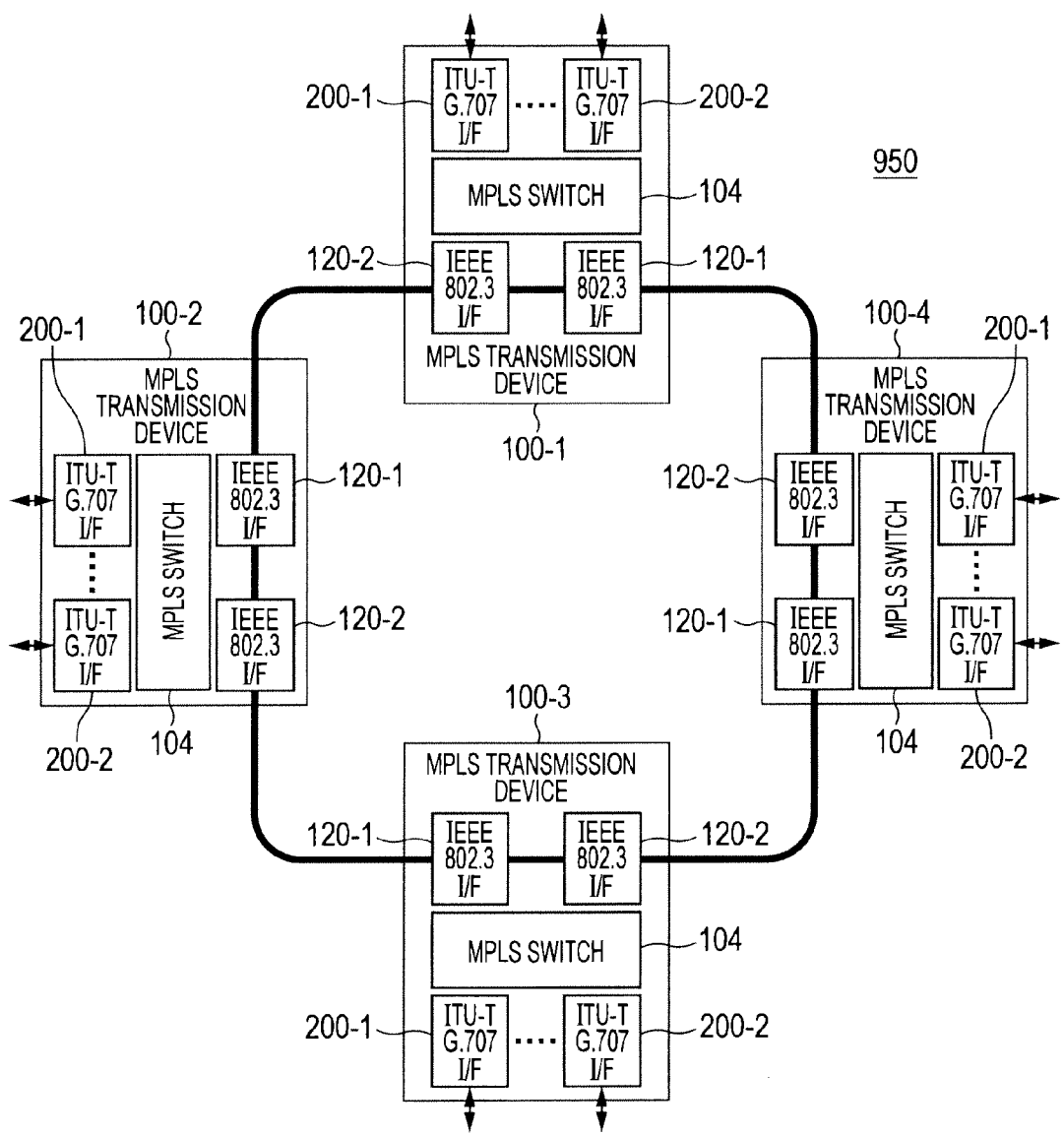
FIG. 11 is a hardware block diagram of a ring network of 4 nodes.

The configuration of networks of MPLS transmission devices will be described with reference to FIGS. 10 and 11. Here, FIG. 10 is a block diagram of a full mesh network in which three MPLS transmission devices are connected. FIG. 11 is a block diagram of a ring network in which four MPLS transmission devices are connected.

In FIG. 10, a full mesh network 900 includes MPLS transmission devices 100-1, 100-2, and 100-3. The MPLS transmission device 100 includes a plurality of ITU-T G.707 interfaces 200 for receiving client signals, an MPLS label switch 104, and plurality of IEEE802.3 interfaces 120. The MPLS transmission devices 100 are connected to each other by the IEEE802.3 interfaces.

A lower-order path of an SDH signal received by the ITU-T G.707 interface 200 is once encapsulated into an MPLS frame by the ITU-T G.707 interface 200, and is forwarded in the form of the MPLS frame to the other device through the IEEE802.3 interface 120. The forwarded MPLS frame is mapped to the ITU-T G.707 higher-order path and section signal by the ITU-T G.707 interface 200 of the particular device, and is transmitted to a client.

In FIG. 11, a ring network 950 includes MPLS transmission devices 100-1, 100-2, 100-3, and 100-4. The MPLS transmission device 100 includes a plurality of ITU-T G.707 interfaces 200 for receiving client signals, an MPLS label switch 104, and two IEEE802.3 interfaces 120. The MPLS transmission devices 100 are connected to each other by the IEEE802.3 interfaces 120.

A lower-order path of an SDH signal received from the ITU-T G.707 interface 200 is once encapsulated into an MPLS frame by the ITU-T G.707 interface 120, and is forwarded in the form of the MPLS frame to the other device through the IEEE802.3 interface 120. The forwarded MPLS frame is mapped to the ITU-T G.707 higher-order path and section signal by the ITU-T G.707 interface 200 of the particular device, and transmitted to a client.

Fourth Embodiment

Figure 12:
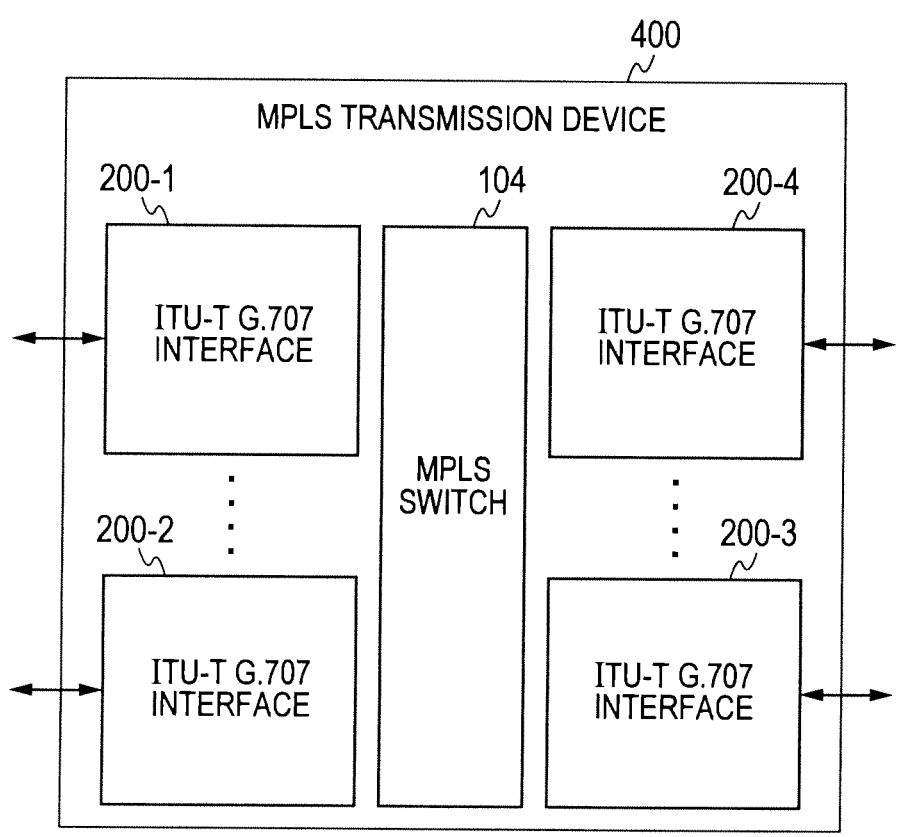
FIG. 12 is a hardware block diagram of a cross-connect device.

An embodiment of a cross connect device will be described with reference to FIG. 12. Here, FIG. 12 is a block diagram of a cross-connect device. In FIG. 12, a cross-connect device (MPLS transmission device) 400 includes at least four ITU-T G.707 interfaces 200-1 to 200-4, and an MPLS switch 104.

A lower-order path of an SDH signal received by the ITU-T G.707 interface 200 is once encapsulated into an MPLS frame by the ITU-T G.707 interface 200A, cross-connected in the form of MPLS frame by the MPLS switch 104, mapped to the ITU-T G.707 higher-order path and section signal by the ITU-T G.707 interface 200B, and then transmitted to a client.

The present invention is designed to increase the transmission efficiency by multiplexing lower-order paths with the same destination into one packet. Also, it is designed to set the delay time associated with the packetization is less than one frame time of SDH/SONET. Thus, the applicability of the present invention is very high, considering the future trend of packetization of the SDH/SONET backbone network.

EXPLANATIONS OF LETTERS OR NUMERALS

6: SDH transmission device
8: Exchange
10: Telephone set
12: Router
16: MPLS frame transmission network
17: Data communication network (DCN) for monitoring control system
18: SDH STM-1 interface
20: SDH C-11 interface
22: Subscribed telephone interface
24: Ether interface
27: MPLS path
28: VC-11 lower-order path
100: MPLS transmission device
104: MPLS switch
110: External monitoring control device
120: IEEE802.3 interface
200: ITU-T G.707 interface
201: Section and higher-order path synchronization establishment
202: Lower-order path synchronization establishment
203: Reception-side buffer
204: MPLS encapsulation part
205: Phase comparison
206: Pointer recalculation
207: Buffer write control at receiving side
208: VC-11 path buffer at receiving side
209: Buffer read control at receiving side
210: Phase align control between lower-order paths
211: Section and higher-order path mapping
212: Lower-order path mapping
213: Transmitting side buffer
214: MPLS encapsulation deletion
217: Buffer write control at transmitting side
218: Buffer for each label at transmitting side
219: Lower-order path data read control
221: Reference phase generating part
222: IF-internal monitoring control
241: Reference frame pulse and clock distribution part
251: Device-internal monitoring control part
261: MPLS encapsulation for each label
222: Pointer swap processing
300: VC-4 payload
301: VC-4 payload for one row
302: VC-11 path accommodation MPLS frame
305: MPLS shim header
308: MPLS label
400: Cross-connect device
505: Reception-side cross-connect table
511: Reception-side VC-11 buffer
521: MPLS encapsulation
531: V1 byte
604: Cross-connect table at transmitting side
622: Multiframe synchronization
621: VC-4 payload mapping
623: Reference frame pulse and reference clock
611: Buffer for each label
616: Buffer for each label
631: Records of cross-connect tables at transmitting side
633: Cross-connect table at transmitting side (for transmitting side label#A)
635: Cross-connect table at transmitting side (for transmitting side label#F)
700: MPLS frame
701: MPLS shim header
702: Management information area
703: MPLS payload
704: Active table flag
801: Receiving side interface
802: Transmitting side interface
900: Mesh network
950: Ring network

What is claimed is:

1. A transmission device comprising:
a first interface connected to a first transmission line; and
a second interface connected to a second transmission line,
wherein the first interface is configured to packetize a lower-order path included in a signal received from the first transmission line into a plurality of first packets,
wherein the second interface is configured to transmit the first packets to the second transmission line, and to forward a second packet received from the second transmission line to the first interface, and
wherein the first interface is configured to generate a transmission signal based on a plurality of the second packets, and to transmit the generated transmission signal to the first transmission line,
wherein the first interface includes a first table that defines the lower-order path and a destination of the first packet, and a second table that defines the second packet and mapping information to the transmission signal,
wherein the first and second tables have an active side and a waiting side, and
wherein the first interface is configured to determine a side of the second table based on side information contained in the second packet.

* * * * *